(12) United States Patent
Shin et al.

(10) Patent No.: US 9,598,556 B2
(45) Date of Patent: Mar. 21, 2017

(54) BINDER COMPOSITION AND HARDCORE PANEL FABRICATION

(71) Applicants: Yu-Jeong Shin, Busan (KR);
Myung-Hwan Kim, Busan (KR);
Myung-Jun Moon, Busan (KR)

(72) Inventors: Yu-Jeong Shin, Busan (KR);
Myung-Hwan Kim, Busan (KR);
Myung-Jun Moon, Busan (KR)

(73) Assignee: Yu-Jeong Shin, Busan (KR)

( * ) Notice: Subject to any disclaimer, the term of this patent is extended or adjusted under 35 U.S.C. 154(b) by 0 days.

(21) Appl. No.: 14/555,621

(22) Filed: Nov. 27, 2014

(65) Prior Publication Data

US 2015/0166764 A1 Jun. 18, 2015

(30) Foreign Application Priority Data

Nov. 27, 2013 (KR) .................. 10-2013-0145357
Nov. 27, 2013 (KR) .................. 10-2013-0145359

(51) Int. Cl.

| | |
|---|---|
| *C08K 3/34* | (2006.01) |
| *C08K 3/36* | (2006.01) |
| *C08K 3/40* | (2006.01) |
| *B28B 1/24* | (2006.01) |
| *E04C 2/00* | (2006.01) |
| *E04C 2/04* | (2006.01) |

(52) U.S. Cl.
CPC .................. *C08K 3/34* (2013.01); *B28B 1/24* (2013.01); *C08K 3/36* (2013.01); *C08K 3/40* (2013.01); *E04C 2/049* (2013.01)

(58) Field of Classification Search
CPC .... C08K 3/34; C08K 3/36; C08K 3/40; B28B 11/243; B28B 3/00; B28B 1/24; E04C 2/20; E04C 2/049

USPC .................. 524/493, 145, 547; 526/279
See application file for complete search history.

(56) References Cited

FOREIGN PATENT DOCUMENTS

| CN | 103192161 A * 7/2013 |
|---|---|
| KR | 1020120082267    1/2013 |

OTHER PUBLICATIONS

Figovsky et al. "Optimal composition, strength and durability of silicate polymer concrete", Scientific Israel-Technological Advantages (2009), 11 (1), 41-51 (STIC Search, pp. 38-40).*

* cited by examiner

*Primary Examiner* — Michael M Bernshteyn
(74) *Attorney, Agent, or Firm* — Madeline F. Schiesser; Keohane & D'Alessandro PLLC

(57) ABSTRACT

An inorganic water resistant binder composition comprising liquefied sodium silicate, which can be used to fabricate lightweight, water resistant hardcore panels, is provided herein. Specifically, the inorganic water resistant binder composition comprises 50.0-94.0 parts by weight of liquefied sodium silicate, which comprises 76.0-80.0 parts by weight of silicon, 19.6-23.0 parts by weight of sodium, 0.15-0.35 parts by weight of potassium, 0.20-0.30 parts by weight of aluminum, and 0.05-0.15 parts by weight of iron; 5.0-30.0 parts by weight of nano silica; and 0.5-10.0 parts by weight of a silane composition, which enhance water resistance of the binder composition. A process is provided for fabrication of a lightweight, highly water resistant hardcore panel by mixing the components of the binder composition described above with inorganic additives, such as an inorganic filler and a strength enhancer.

19 Claims, 6 Drawing Sheets

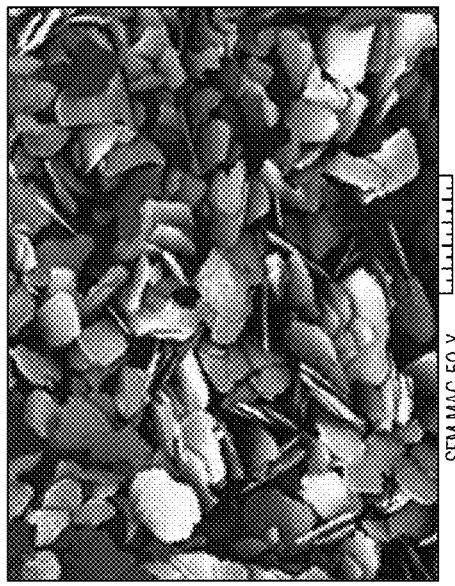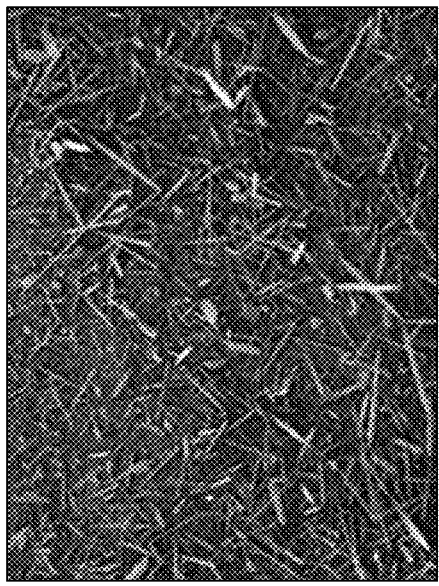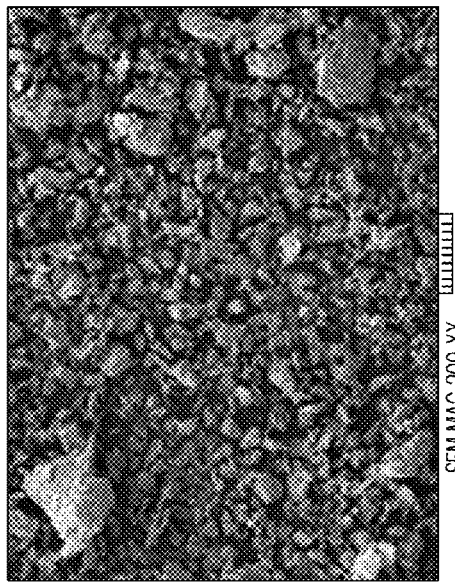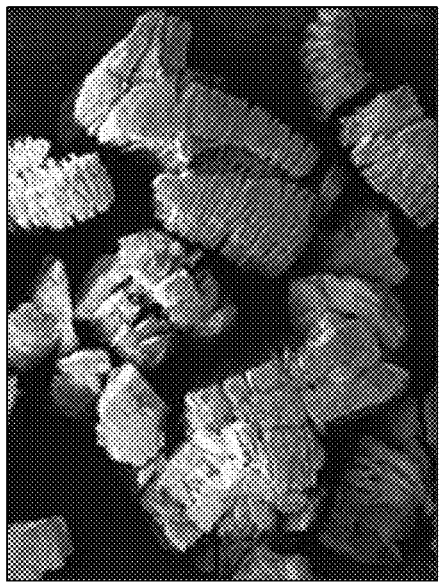

BINDER COMPOSITION AND HARDCORE PANEL FABRICATION

CROSS-REFERENCE TO RELATED APPLICATION

This application claims priority under 35 U.S.C. §119 to Korean Patent Applications Numbers 10-2013-0145357 and 10-2013-0145359, filed on Nov. 28, 2013, in the Korean Intellectual Property Office, the contents of which are incorporated herein by reference.

TECHNICAL FIELD

This invention relates generally to a binder composition and, more specifically, to an inorganic water resistant binder comprising liquefied sodium silicate.

BACKGROUND

The properties of materials sought in building may vary greatly depending on what structure they are being used to build. For example, it is generally desirable that materials used to construct a building be strong and, for instance, resistant to compressive forces. In another example, it is generally desirable that materials used to construct structures in environments in which strong winds and/or seismic activity may occur be, for instance, flexible and/or resistant to shearing and/or tensile forces. In yet another example, it is generally desirable that materials used to construct structures, including boats, in or near wet environments be resistant to water. Fabricating a structure out of a material that is poorly suited for the environment in which the structure is intended to be used or operated can result in the structure being compromised or ruined by the surrounding environment.

SUMMARY

In general, embodiments described herein provide an inorganic water resistant binder composition comprising liquefied sodium silicate and a method of fabricating lightweight, water resistant hardcore panels using the binder composition. Specifically, the liquefied sodium silicate comprises about 76.0-80.0 parts by weight of silicon, about 19.6-23.0 parts by weight of sodium, about 0.15-0.35 parts by weight of potassium, about 0.20-0.30 parts by weight of aluminum, and about 0.05-0.15 parts by weight of iron. Furthermore, the inorganic water resistant binder composition comprises about 50.0-94.0 parts by weight of liquefied sodium silicate, about 5.0-30.0 parts by weight of nano silica and about 0.5-10.0 parts by weight of a silane composition, which enhance water resistance of the binder composition. A method is provided for fabrication of a lightweight, highly water resistant hardcore panel from the inorganic water resistant binder composition and inorganic additives, such as an inorganic filler and a strength enhancer.

One aspect of the present invention includes a binder composition comprising: about 50.0-94.0 parts by weight of liquefied sodium silicate; about 5.0-30.0 parts by weight of nano silica; and about 0.5-10.0 parts by weight of a silane composition, wherein the liquefied sodium silicate, the nano silica, and the silane composition are combined.

Another aspect of the present invention includes a lightweight, water resistant hardcore panel, comprising: a binder composition comprising liquefied sodium silicate; a filler; and a strength enhancer, wherein the binder composition, the filler and the strength enhancer have been homogenized and dehydrated.

Yet another aspect of the present invention includes a method for fabricating a hardcore panel, the method comprising: mixing a binder composition, comprising liquefied sodium silicate, and inorganic additives together to form a mixture; placing the mixture into a mold; and hardening the mixture in the presence of at least one of: heat and reduced pressure.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which:

FIG. 3A shows a sample of vermiculite observed by an electron microscope according to illustrative embodiments;

FIG. 3B shows a sample of mica observed by an electron microscope according to illustrative embodiments;

FIG. 3C shows a sample of calcium silicate observed by an electron microscope according to illustrative embodiments;

FIG. 3D shows a sample of aluminum silicate observed by an electron microscope according to illustrative embodiments;

Figure 1:
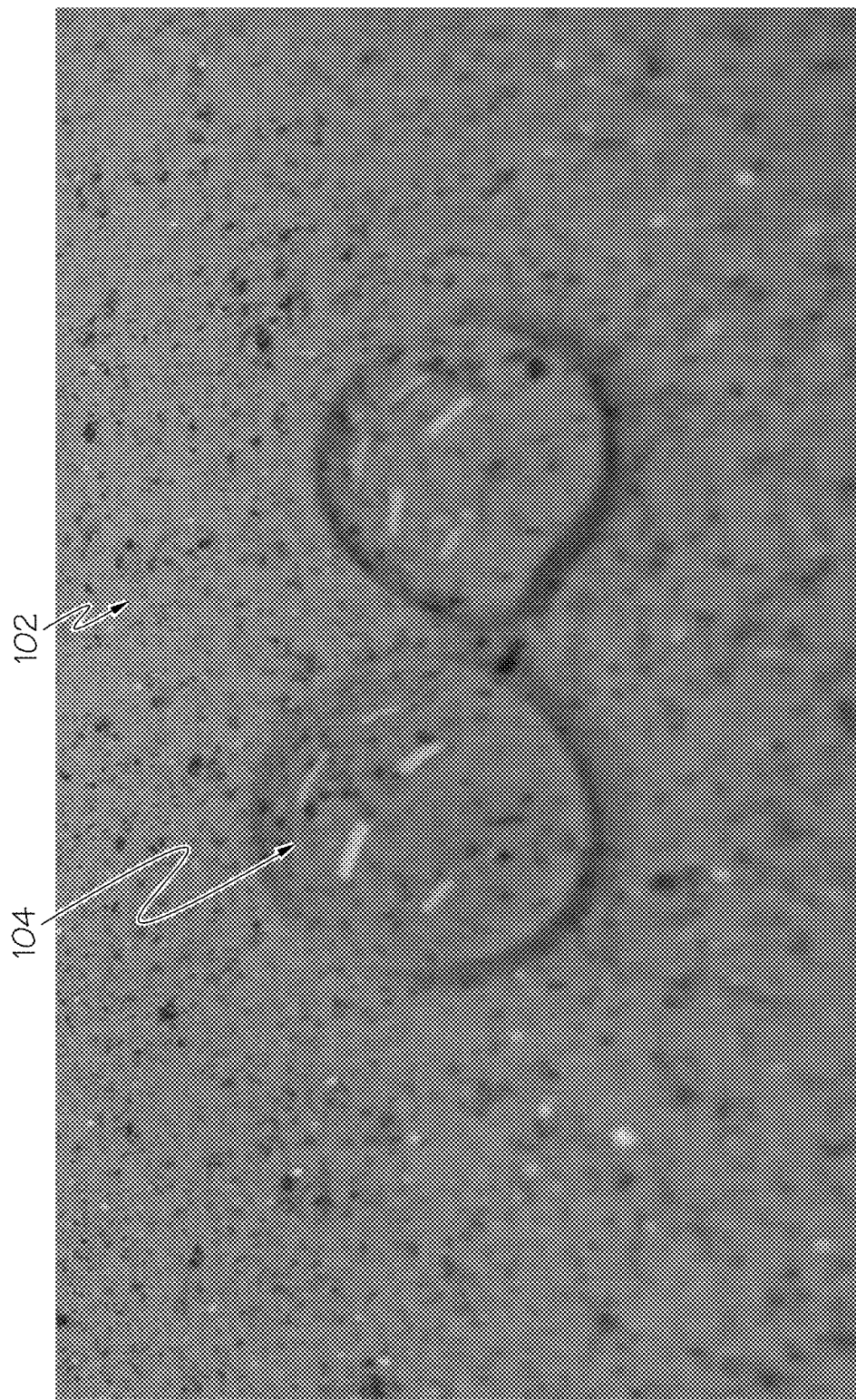
FIG. 1 shows a water resistant hardcore material according to illustrative embodiments.
Figure 2A:
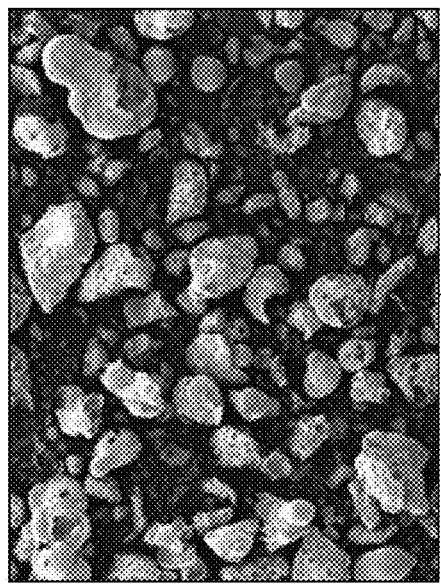
FIGS. 2A-2D shows perlite samples observed by an electron microscope according to illustrative embodiments.
Figure 2B:
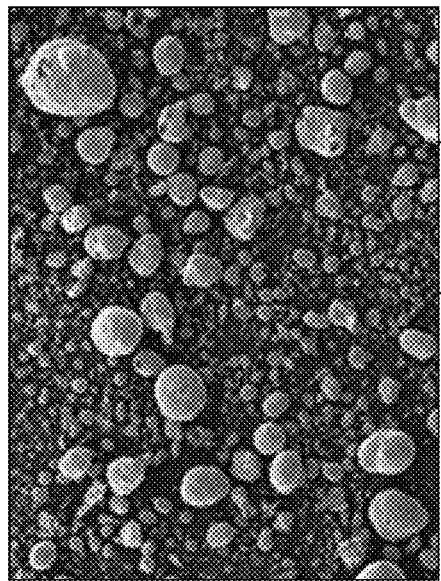
Figure 2C:
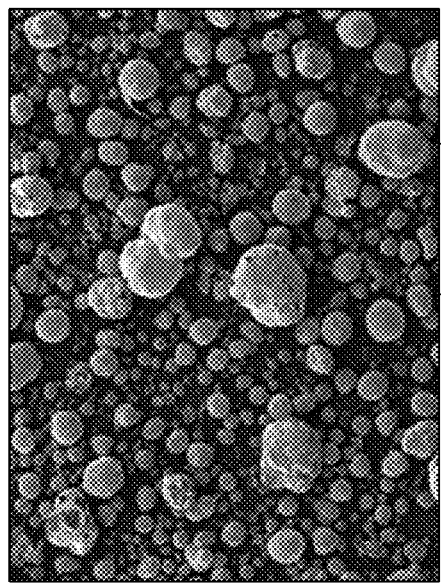
Figure 2D:
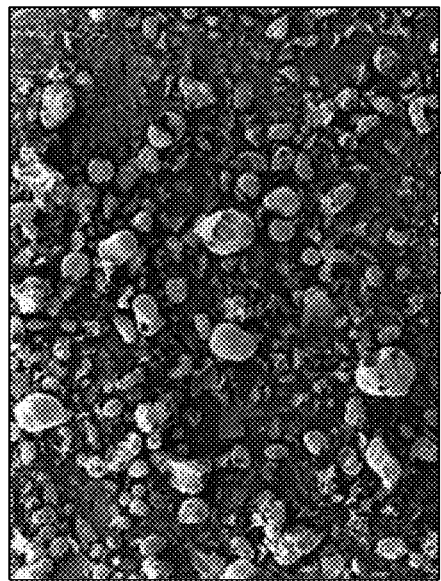

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As stated above, embodiments described herein provide an inorganic water resistant binder composition comprising liquefied sodium silicate and a method of fabricating lightweight, water resistant hardcore panels using the binder composition. Specifically, the liquefied sodium silicate comprises about 76.0-80.0 parts by weight of silicon, about 19.6-23.0 parts by weight of sodium, about 0.15-0.35 parts by weight of potassium, about 0.20-0.30 parts by weight of aluminum, and about 0.05-0.15 parts by weight of iron. Furthermore, the inorganic water resistant binder composition comprises about 50.0-94.0 parts by weight of liquefied sodium silicate, about 5.0-30.0 parts by weight of nano silica and about 0.5-10.0 parts by weight of a silane composition, which enhance water resistance of the binder composition. A method is provided for fabrication of a lightweight, highly water resistant hardcore panel from the inorganic water resistant binder composition and inorganic additives, such as an inorganic filler and a strength enhancer.

The inventors of the present invention have discovered several shortcomings of hardcore panel construction materials. For example, hardcore panels can comprise inorganic ingredients, most of which are hydrophilic. However, many structures (e.g., boats), are built for use and/or operation in wet environments. Yet, hardcore panels, with hydrophilic inorganic ingredients, are often used for interior material of boats, including passenger and fishing boats. The inventors have found that the material properties of these hardcore panels can degrade when used in wet conditions. The inventors have also found that many hardcore panels, while strong, may lack flexibility. Therefore, it is desirable that certain hardcore panels be sufficiently water resistant.

The approaches described herein contain numerous advantages over present hardcore panels including, but not limited to, high water resistance and increased flexibility. A further description of how to enhance hardcore panels with these properties will be further detailed below.

For convenience, some embodiments of the invention will be described in the following sections:

I. Inorganic Binder Composition
II. Water Resistant Hardcore Panel
III. Method of Hardcore Panel Fabrication I. Inorganic Binder Composition In an embodiment of the present invention, an inorganic binder composition comprising "liquefied" silicate, nano silica, and a silane composition is provided. In some embodiments, the inorganic binder composition comprises about 50.0-94.0 parts by weight of the liquefied silicate, about 5.0-30.0 parts by weight of the nano silica, and about 0.5-10.0 parts by weight of the silane composition.

The liquefied silicate of the inorganic binder composition is in some embodiments a fluid (i.e. liquid) sodium silicate solution comprising about 76.0-80.0 parts by weight of silicon (Si), about 19.6-23.0 parts by weight of sodium (Na), about 0.15-0.35 parts by weight of potassium (K), about 0.20-0.30 parts by weight of aluminum (Al), and about 0.05-0.15 parts by weight of iron (Fe). In the liquid sodium silicate solution, the silicon is a silicon anion, such as silicon oxide ($SiO_4^{-4}$), although other silicon anions are also within the scope of the invention. In some embodiments, the sodium silicate solution may be water-based. As stated hereinabove, in some embodiments, the inorganic binder composition comprises about 50.0-94.0 parts by weight of the liquefied silicate. All parts by weight listed in this application, unless otherwise specified, do not include the weight of water, or any other liquid which may be used to create a solution/suspension of the composition whose weight is given.

Methods of making sodium silicate solution are generally understood in the art, and methods of making the liquefied silicate of the present invention will be appreciated by those trained in the art in light of this disclosure and are therefore not detailed here.

The ratios described above between silicon and sodium are generally desired in some embodiments because when the amount of silicon in the liquefied silicate component of the binder composition is increased, the binder composition may develop increasingly glass-like properties, including high viscosity, less flexibility, and less workability. However, as the amount of silicon in the liquefied silicate component of the binder composition is increased, the strength and water resistance of the binder composition is also enhanced. Conversely, when the amount of sodium (Na) in the liquefied silicate component of the binder composition is increased, the binder composition has increased water solubility. The ratios described herein permit sodium silicate to be in a liquefied state. This offers an improvement over typical silicates, because generally many silicates often "gel" very easily and become quite dense, which makes the silicate difficult to work with.

Illustrative examples of liquefied silicate are shown in Table 1 below. The illustrative embodiments shown in Table 1 are not intended as limiting, but rather are intended merely to demonstrate some of the ratios of silicon (Si) to sodium (Na) to potassium (K) to aluminum (Al) to iron (Fe) the inorganic binder composition may be comprised of. It should be noted that impurities are not discussed in the table below or other tables throughout this disclosure, but it is generally understood that in some embodiments, liquefied silicate, and other compositions disclosed herein, may contain a small quantity of impurities (e.g., less than 1% by weight).

TABLE 1

Examples of Liquefied Silicate

|  | Example #1 | Example #2 |
| --- | --- | --- |
| Si (weight %) | 79.791 | 76.757 |
| Na (weight %) | 19.707 | 22.388 |
| K (weight %) | 0.174 | 0.339 |
| Al (weight %) | 0.245 | 0.235 |
| Fe (weight %) | 0.082 | 0.121 |

The nano silica of the inorganic binder composition is nanometer scaled silicon dioxide ($SiO_2$) particles. The silicon in the nano silica contributes to the strength of the binder composition, while the structure of the nano silica enhances water resistance and repellency of the binder composition. As stated hereinabove, in some embodiments, the inorganic binder composition comprises about 5.0-30.0 parts by weight of nano silica.

In Table 2 below, a set of empirically-based examples are presented demonstrating how water resistance increases in a binder composition with increased nano silica. These results were obtained by adding liquid (e.g., distilled water) containing a quantity of nanometer scaled silica particles into a quantity of liquefied silicate to form a binder composition.

The resultant mixture is then dehydrated and then put into distilled water for a period of time (e.g., 48 hours). After this period of time has elapsed, the percent of binder composition remaining was observed as a measure of water resistancy.

TABLE 2

Binder Remaining after 48 hour Water Exposure

|  | Sample 1 | Sample 2 | Sample 3 | Sample 4 | Sample 5 |
|---|---|---|---|---|---|
| Liquefied silicate (weight %) | 95 | 90 | 85 | 80 | 75 |
| Nano silica (weight %) | 5 | 10 | 15 | 20 | 25 |
| Distilled water (weight %) | 10 | 10 | 10 | 10 | 10 |
| Total (weight %) | 110 | 110 | 110 | 110 | 110 |
| Remaining binder (%) | 12 | 22 | 36 | 40 | 5 |

As shown in samples 1 to 4 of Table 2, water resistance is enhanced by increasing the ratio of nano silica to liquefied silicate at least up to a certain point.

The silane composition of the inorganic binder composition comprises a mixture of one or more silicon monomers, or silanes. A silane is a monomeric silicon chemical in which four substituents ($R_1$, $R_2$, $R_3$ and $R_4$) are attached to the silicon atom, and which has chemical formula: $R_1SiR_2R_3R_4$. Although, for the purpose of this application, silane includes any silicon monomers, it should be noted that the simplest silicon monomer ($SiH_4$) is also commonly called silane (hereinafter "monosilane"), and, inter alia, has water repellant properties. The silane composition may comprise one or more of monosilane, any organofunctional alkoxysilane, tetraethoxysilane, methylethoxysilane, sodium methylsiliconate, methyltrimethoxysilane, potassium methylsiliconate, butyltrimethoxysilane, vinyltrimethoxysilane, and any other silane. As stated hereinabove, in some embodiments, the inorganic binder composition comprises about 0.5-10.0 parts by weight of silane composition.

Water resistance of the inorganic binder composition is enhanced by the presence of the silane composition. A silane molecule typically has two types of substituents. Typically the silane molecule has one organofunctional substituent, which comprises an organic group (e.g., -methyl, -phenyl), and three hydrolyzable substituents, which contain inorganic groups. In some instances, however, a silane molecule may instead have a ratio of two, three, four, or no organofunctional substituents to two, one, no, or four hydrolyzable substituents, respectively. In any case, the presence of these organofunctional and hydrolyzable substituents generally result in a substance which has highly hydrophobic properties when exposed to water. Therefore, materials comprising silane are generally hydrophobic as well and resist water. Furthermore, the presence of silane also enhances material strength. Accordingly, the water resistance and strength of the inorganic binder composition is enhanced by the presence of the silane composition.

In Table 3 below, a set of empirically-based examples are presented demonstrating how water resistance increases in a binder composition with an amount of silane composition. These results were obtained by adding a quantity of silane composition (e.g., alkoxysilane) into a quantity of liquefied silicate to form a binder composition. The resultant mixture is then dehydrated and then put into distilled water for a period of time (e.g., 48 hours). After this period of time has elapsed, the percent of binder composition remaining was observed as a measure of water resistancy.

TABLE 3

Binder Remaining after 48 hour Water Exposure

|  | Sample 6 | Sample 7 | Sample 8 | Sample 9 |
|---|---|---|---|---|
| Liquefied silicate (weight %) | 97.5 | 95.0 | 92.5 | 90 |
| Alkoxysilane (weight %) | 2.5 | 5.0 | 7.5 | 10.0 |
| Distilled water (weight %) | 10 | 10 | 10 | 10 |
| Total (weight %) | 110 | 110 | 110 | 110 |
| Remaining binder (%) | 0 | 2.8 | 3.3 | 19.5 |

As shown in samples 6 to 9 of Table 3, water resistance of the binder composition is enhanced by increasing the ratio of silane composition to liquefied silicate up to at least 10% by weight. Furthermore, it was observed that a silane, e.g., alkoxysilane, provides hydrophobic properties to the surface of material made with the binder composition.

In some embodiments, the inorganic binder composition of the present invention may be formed by, in a first step, mixing together liquefied silicate, nano silica, and a silane composition in ratios within approximately any of the ranges described in Table 4 below. In some embodiments, components of the binder composition may be added separately, (e.g., at separate times). Furthermore, the liquefied silicate, nano silica, and a silane composition may be mixed together in any order. In some embodiments, nano silica may be added to the binder composition as nano silica in a liquid, such as water. It should be noted that the parts by weight listed in all tables do not account for additional water added to any mixture. In still other embodiments, any of the liquefied silicate, nano silica, and silane composition may be added to the binder composition as their component parts. For example, in the case of the silane composition, one or more silanes may be added directly to the binder composition as opposed to being first added to one another to form a single silane composition which is then added to the binder composition.

TABLE 4

Inorganic Binder Composition

|  | Liquefied Silicate | Nano Silica | Silane Composition |
|---|---|---|---|
| Parts by Weight | 50.0-94.0 | 5.0-30.0 | 0.5-10.0 |

In some embodiments, the inorganic binder composition of the present invention may furthermore be formed by hardening the inorganic binder composition formed from the liquefied silicate, the nano silica, and the silane composition. In some embodiments, this hardening may be accomplished by the presence of heat and/or reduced pressure. The resultant, hardened inorganic binder composition has a highly water resistant property, as seen in FIG. 1, in which hardcore panel 102, fabricated by adding alkoxysilane into liquefied silicate, is shown repelling water drops 104.

II. Water Resistant Hardcore Panel

In another embodiment of the present invention, a lightweight, highly water resistant hardcore panel is provided. In some embodiments, this water resistant hardcore panel can be formed from a mixture of the inorganic binder composition, described above, and inorganic additives, where the mixture is subsequently dehydrated (i.e., dried out or all water removed by applying heat or a change in pressure). In some embodiments, these inorganic additives can include an inorganic filler and a strength enhancer. In some embodiments, the hardcore panel mixture comprises about 100 parts by weight of inorganic binder composition, about 35-70 parts by weight of inorganic filler, and about 15-45 parts by weight of strength enhancer.

The inorganic filler of the inorganic additives of the hardcore panel may comprise one or more of perlite and vermiculite, or any combination thereof. Perlite is generally notable as a lightweight micro-hollow sphere filler. It is generally easy to mix with other materials due to excellent liquidity of hollow sphere structure. Vermiculite is generally notable as a lightweight material and has thermal expansion properties. The inorganic filler, such as perlite and vermiculite, may be used to form the main structure of hardcore panels. Such inorganic fillers as these have a low weight or density, and therefore may be used to keep the weight or density relatively low of substances to which the inorganic filler is added, such as the hardcore panels.

The strength enhancer of the inorganic additives of the hardcore panel may comprise one or more of mica, aluminum silicate, and calcium silicate, or any combination thereof. Generally, strength enhancers such as these listed have flake-shaped or needle-shaped particles. These particles enhance the strength of substances of which they are a component (such as hardcore panels) by bridging materials or filling in cavities. However, some strength enhancers also tend to be heavy. As such, it is generally desirable to control the amount of the strength enhancer relative to the amount of inorganic filler in order to produce lightweight panels. Methods of achieving a strong, but lightweight ratio of strength enhancer to inorganic filler will be apparent to those trained in the art, and therefore will not be discussed in detail here.

The inorganic binder composition of the water resistant hardcore panel is the same as the inorganic binder composition described above, and therefore will not be described again in detail here. As described above, the inorganic binder composition enhances water resistance. Accordingly, adding the inorganic binder composition to the components described above in forming a hardcore panel results in a hardcore panel that is also water resistant.

Referring now to FIGS. 2 and 3 and Tables 5 and 6 below, an analysis of the inorganic filler and the strength enhancer was conducted. Table 5 shows empirical data demonstrating the relationship between the specific gravities of the inorganic additives of the hardcore panel and an amount of water the inorganic additives absorb. As can be observed from Table 5, additives with lower specific gravities generally (although not in every instance) absorb more water than additives with higher specific gravities. Therefore, although creating hardcore panels with additives with low specific gravities results in lightweight panels, such panels may have a tendency to absorb water, unless such water absorbency is counter balanced, e.g., by the water resistant inorganic binder composition.

TABLE 5

Specific Gravity of Additives and Amount of Water Absorbed

| Additive | Apparent specific gravity | Amount of absorbed water (g/100 g) |
|---|---|---|
| Perlite (FIG. 2A) | 0.057 | 400 |
| Perlite (FIG. 2B) | 0.173 | 240 |
| Perlite (FIG. 2C) | 0.101 | 200 |
| Perlite (FIG. 2D) | 0.106 | 200 |
| Vermiculite (FIG. 3A) | 0.165 | 140 |
| Mica (FIG. 3B) | 0.267 | 60 |
| Calcium silicate (FIG. 3C) | 0.715 | 100 |
| Aluminium silicate (FIG. 3D) | 0.275 | 50 |

Table 6 shows empirical data demonstrating the relationship between a quantity perlite the binder accepts and a volume of the binder and the perlite mixture. In Table 6, the volume of the mixture is measured before hydration. As shown in Table 6 below and FIG. 2, the inorganic filler perlite, samples of which are pictured in FIG. 2, which forms the main structure of a hardcore panel mixture, contributes to lowering the weight (specific gravity) of a hardcore panel mixture due to the low specific gravity of the perlite itself. Another useful feature of perlite is that it expands when heat is applied. As will be discussed in more detail further below, the hardcore panel mixture may be dehydrated via heat. Therefore, in the event that a hardcore panel mixture comprises perlite and is exposed to heat, the specific gravity of the hardcore panel mixture is further lowered due to the expansive property of perlite itself.

TABLE 6

Amount of Perlite Accepted by Binder Composition

| Additive | The amount of perlite in the binder (ml/10 g) | The volume of the mixture (ml) |
|---|---|---|
| Perlite (FIG. 2A) | 36.0 | 66.7 |
| Perlite (FIG. 2B) | 21.6 | 50.0 |
| Perlite (FIG. 2C) | 18.0 | 48.0 |
| Perlite (FIG. 2D) | 18.0 | 42.0 |

In much the same manner, vermiculite, pictured in FIG. 3A, of which the inorganic filler may also be comprised, also lowers the weight/specific gravity of a hardcore panel mixture due to the low specific gravity of the vermiculite itself.

As discussed above, in some embodiments a strength enhancer, such as aluminium silicate, pictured in FIG. 3D, may be added to the hardcore binder mixture. Aluminium silicate contributes to the strength of the panel by bridging materials or filling in cavities among the other materials in the hardcore binder mixture. Mica, pictured in FIG. 3B, and calcium silicate, pictured in FIG. 3C, likewise also strengthen a hardcore panel. Moreover, because mica and calcium silicate have relatively high specific gravity, it may be desirable to form a strength enhancer composition of an intermediate specific gravity by mixing these strength enhancers with strength enhancers of a relatively lower specific gravity (such as aluminium silicate) to more easily mix the strength enhancers with the binder composition. Therefore, in some embodiments, the strength enhancer may comprise a mixture of one or more of aluminum silicate, mica and calcium silicate.

Based on the analysis above, in some embodiments, the hardcore panel mixture is formed by mixing the inorganic binder composition with both an inorganic filler, such as perlite or vermiculite, and a strength enhancer, such as mica or silicates. This optimizes the strength and weight of the hardcore panel. This embodiment should not be construed as limiting, however. For example, in some embodiments, the inorganic binder composition may be mixed with only an inorganic filler to form a hardcore panel.

A more detailed account of processes and methods of fabricating the water resistant hardcore panel from the materials described hereinabove will be described further below.

III. Method of Hardcore Panel Fabrication

Figure 4:
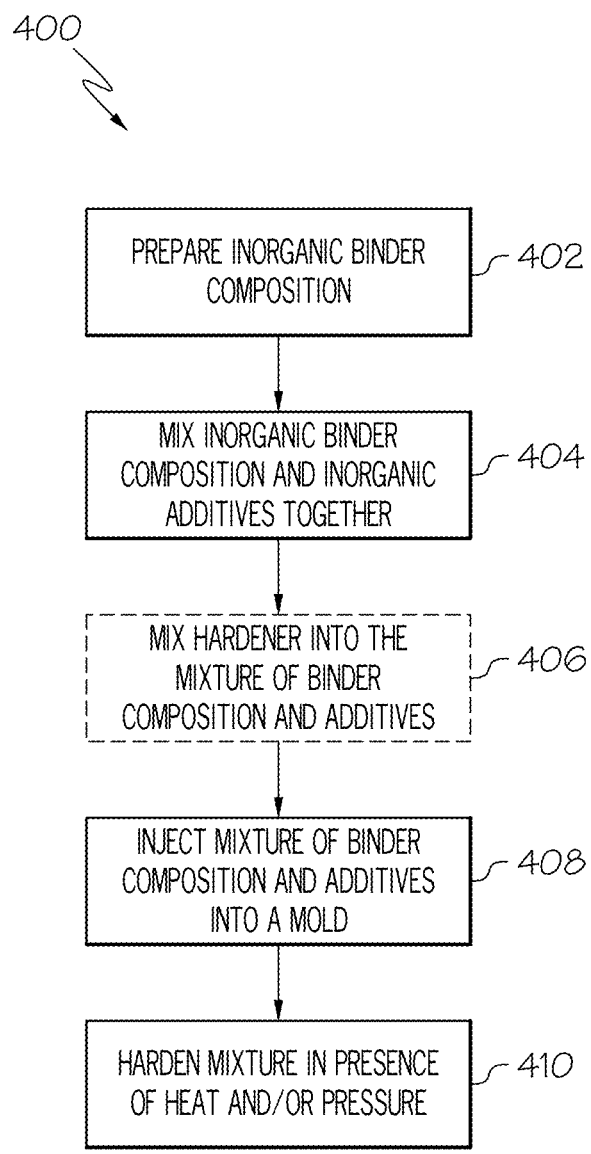
FIG. 4 shows a process flowchart for hardcore panel fabrication according to illustrative embodiments.

Referring now to FIG. 4, still another embodiment of the present invention is shown. FIG. 4 depicts process flowchart 400 for fabricating water resistant hardcore panels. At step 402, an inorganic binder composition is prepared. As described infra, the inorganic binder composition is a mixture comprising about 50.0-94.0 parts by weight of "liquefied" silicate, about 5.0-30.0 parts by weight of nano silica, and about 0.5-10.0 parts by weight of a silane composition. These substances are described in detail infra. At step 404, the inorganic binder composition and inorganic additives are mixed together. As described infra, inorganic additives generally include an inorganic filler and a strength enhancer, also described in more detail infra. At optional step 406, a hardener may be added into the mixture of inorganic binder composition and inorganic additives. At step 408, the mixture is injected into a mold. At step 410, the mixture is hardened in the presence of heat and/or reduced pressure.

Process flowchart 400 of FIG. 4 illustrates the architecture, functionality, and operation of possible implementations of methods and systems according to various embodiments of the present invention. It should also be noted that, in some alternative implementations, the functions noted in the blocks might occur out of the order depicted in the figure. For example, two blocks shown in succession may, in fact, be executed substantially concurrently.

As described in step 404 of FIG. 4, the inorganic binder composition and inorganic additives are mixed together to form a hardcore panel mixture. As seen in Table 7 below, in some embodiments, the hardcore panel mixture comprises about 100 parts by weight of inorganic binder composition and inorganic additives comprising about 35-70 parts by weight of inorganic filler and about 15-45 parts by weight of strength enhancer. In some embodiments, water may also be added to the hardcore panel mixture, but water has been excluded as a part by weight for the purpose of this discussion. Furthermore, the hardcore panel mixture, however, is not limited to these ratios, and they are intended only as illustrative embodiments. It will be appreciated that variations and modifications will occur to those skilled in the art. In any case, the inorganic binder composition and inorganic additives are mixed together and homogenized, or mixed thoroughly.

TABLE 7

Hardcore Panel Mixture

| | Inorganic Binder Composition | Inorganic Filler | Strength Enhancer | Hardener (optional) |
|---|---|---|---|---|
| Parts by Weight | 100 | 35-70 | 15-45 | 0.1-5.0 |

As described in optional step 406 of FIG. 4, in some embodiments a hardener may be added to the hardcore panel mixture. The hardener may be added to the hardcore panel mixture at any time, such as simultaneous to the adding of the inorganic binder composition and/or inorganic additives, or subsequent to the addition of these materials. The hardener may be used, inter alia, to enhance hardening of the hardcore panel mixture. As seen in Table 7, infra, in some embodiments, the hardcore panel mixture may comprise about 0.1-5.0 parts by weight of hardener. In some embodiments, the hardener may comprise one or more of potassium hydroxide, potassium carbonate, sodium phosphate, sodium sulfate, or any combination thereof.

As described in step 408 of FIG. 4, the hardcore panel mixture is injected onto a mold. In some embodiments, the mold is shaped for the formation of a flat panel. In other embodiments, the mold may be shaped for the formation of panels of other shapes (e.g., curved panels). Furthermore, although in some embodiments the hardcore panel mixture is injected onto a mold, it may also be poured, spread, placed, infused, or other variations that will be appreciated by those trained in the art. In one embodiment, a heated press may be used as a mold and a dehydrator, as will be further explained with respect to step 410 below.

As described in step 410 of FIG. 4, the hardcore panel mixture is hardened in the presence of heat and/or pressure. In some, but not all, embodiments, both heat and a change in pressure may be applied. The application of heat and/or a reduced pressure dehydrates the hardcore panel mixture, forming a hardcore panel. Generally, applying hot air and evacuating pressure reduces hardening time. In some embodiments, the hardcore panel mixture is hardened for at least three (3) minutes.

Figure 5:
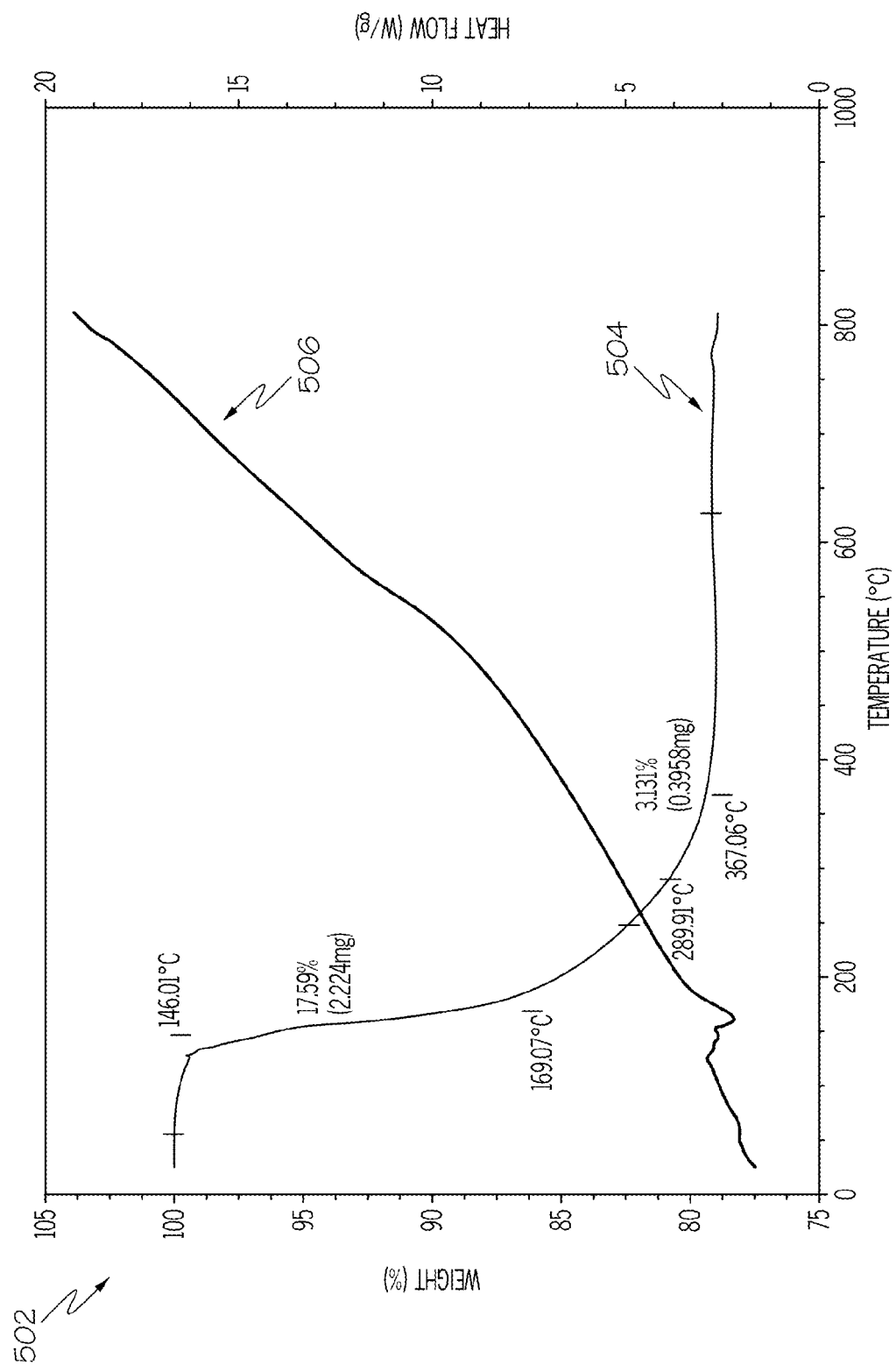
FIG. 5 shows a graph depicting a relation between hardening temperature and water resistance according to illustrative embodiments.

Referring now to FIG. 5, in addition to step 410 of FIG. 4, a thermal analysis of the hardcore panel mixture, comprising the inorganic binder composition, during the dehydration step is shown. FIG. 5 represents the relation between the hardening temperature and water resistance of the inorganic binder composition of the hardcore panel mixture as DSC-TGA graph 502. Graph 502 shows differential scanning calorimetry (DSC) curve 504, derived from empirical data. DSC curve 504 shows the amount of heat required to increase the temperature of a sample of hardcore panel mixture as a function of temperature. Graph 502 further shows thermogravimetric analysis (TGA) curve 506, derived from empirical data. TGA curve 506 shows the percent change in mass of a sample of hardcore panel mixture as a function of temperature. DSC curve 504 and TGA curve 506 are depicted here for illustrative purposes only, and are not intended to be limiting.

As seen in graph 502, up to a temperature of about 140° C., the hardcore panel mixture remains primarily hydrated. Between about 140° C. and about 290° C., the hardcore panel mixture loses mass (i.e., water) until it reaches a steady mass, at which point the mixture is assumed fully dehydrated. Therefore, in some embodiments, the optimal temperature range for hardening the hardcore panel mixture in the presence of heat is between about 140° C. and about 290° C.

Figure 6B:
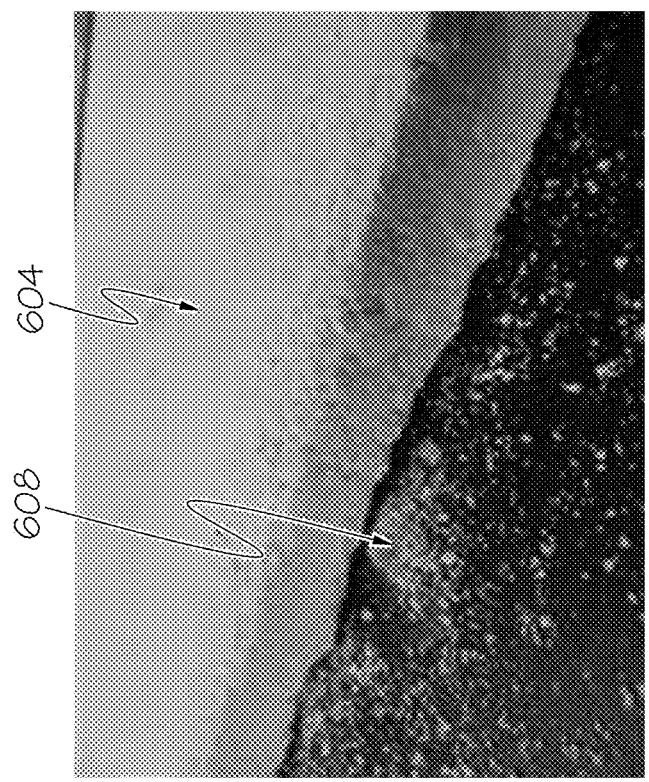
FIGS. 6A and 6B show samples of hardcore panels according to illustrative embodiments.
Figure 6A:
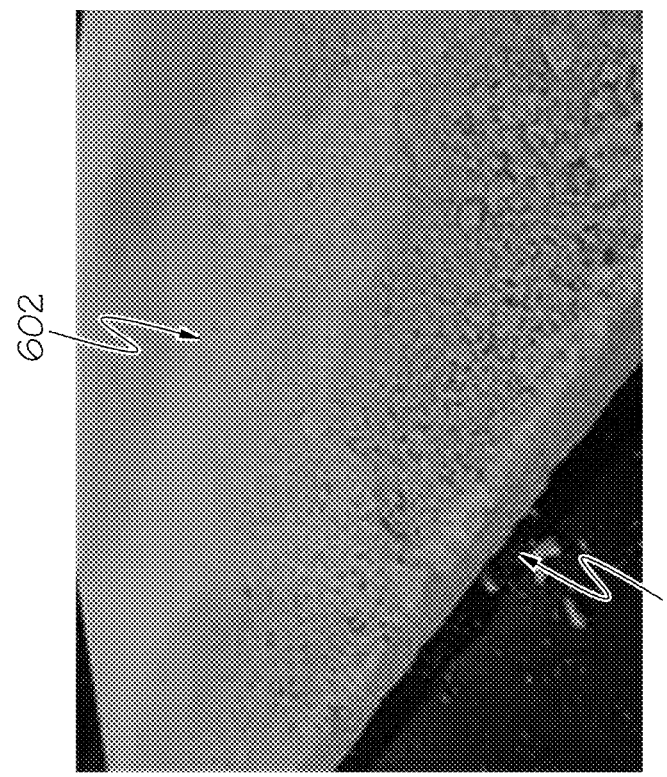

Referring now also to FIGS. 6A and 6B in addition to FIG. 5 and step 410 of FIG. 4, heating the hardcore panel mixture at high temperature will be discussed. In some embodiments, when the hardcore panel mixture hardened in the presence of heat at an initial temperature over about 290° C., the surface of the hardcore panel is rapidly dehydrated. This rapid dehydration may result in the surface of the panel being easily broken into small particles. Panel 604 shows the effects of hardening at a temperature above 290° C., because panel 604 easily flakes into small particles 608. On the other hand, panel 602, which was hardened at a temperature below 290° C. shows only minimal flaking 606 because it was not effected by rapid surface dehydration. Therefore, in some embodiments, it is generally desirable to harden the hardcore panel mixture at an initial temperature under about 290° C.

After dehydration is complete, the now dehydrated hardcore panel mixture can be removed from the mold, yielding a hardcore panel that is water resistant due to the presence of the water resistant inorganic binder composition.

A fracture strength analysis of a set of illustrative examples of lightweight, water resistant hardcore panels is presented below. In the illustrative example, the hardcore panels were hardened in a heated press, set at an initial temperature of 290° C. Each panel was subjected to a different hardening duration time. The fracture strength analysis of the set of illustrative example hardcore panels was performed under KS L 3314:2007 standard, and the results are listed below in Table 8. As seen in Table 8, the fracture strength analysis shows that hardcore panels subjected to longer hardening times have superb fracture strength, e.g. over 200 N/cm$^2$.

TABLE 8

Fracture Strength Analysis

| Hardening time (min.) | Fracture strength (N/cm$^2$) |
| --- | --- |
| 20 | 259 |
| 25 | 269 |
| 30 | 310 |
| 35 | 426 |

It should be noted that the fracture strength and hardening time of a hardcore panel can vary according to the ratio of inorganic binder composition, inorganic filler, and strength enhancer. Therefore, Table 8 above is not intended as limiting, but merely serves as an illustrative example. In a further non-limiting example, upon dehydration, the illustrative hardcore panels used in the fracture strength analysis above had the composition ratio of inorganic binder composition to inorganic filler to strength enhancer described below in Table 9. Again, the composition ratios shown in Table 9 are not intended as limiting, but merely serve as illustrative examples.

TABLE 9

Illustrative Hardcore Panel Composition

| Composition | | Weight % |
| --- | --- | --- |
| Inorganic binder | | 52.0 |
| Inorganic filler | Perlite A | 25.0 |
| | Perlite B | 6.0 |
| | Vermiculite | 3.5 |
| Strength enhancer | Aluminium Silicate | 2.5 |
| | Calcium Silicate | 4.5 |
| | Mica | 6.5 |

Several material properties were determined for the illustrative lightweight, water resistant hardcore panels used in the fracture strength analysis of Table 8 and described in Table 9. These various material properties are described in Table 10 below. As can be seen from Table 10, among features of the hardcore panels is a relatively low weight or low density. Furthermore, the hardcore panels have a low heat conductivity and thermal expansion coefficient, which makes the panels resistant to flammability. Moreover, the hardcore panels have a high fracture strength and a high tensile strength, which allows the panels to be strong.

TABLE 10

Illustrative Hardcore Panel Material Properties

| Property | Value | Unit | Method of analysis |
| --- | --- | --- | --- |
| Density | 420 | kg/m$^3$ | KS L 3114 |
| Heat conductivity | 0.094 | W/mK | KS L 9016 |
| Thermal expansion coefficient | 0.089 × 10$^{-6}$ | m/mK | KS L 3116 |
| Fracture strength | 4.26 | N/mm$^2$ | KS L 3314 |
| Tensile strength | 1.2 | N/mm$^2$ | KS M ISO 527-2 |

The lightweight, water resistant hardcore panels of the present invention may have a variety of uses. In a non-limiting example, the hardcore panels may serve as interior materials of vessels such as fishing and passenger boats. In another non-limiting example, the hardcore panels may be employed as construction material to build structures in wet locations, such as houses in areas which receive high amounts of precipitation or in particularly moist environments. In short, the lightweight, water resistant hardcore panels of the present invention may be utilized in any situation which calls for strong, but lightweight building material, and, furthermore, is preferable (as opposed to non-water resistant materials) to use in any wet environment.

It is apparent that there has been provided a description of a water resistant binder composition and methods of use in hardcore panel fabrication. While the invention has been particularly shown and described in conjunction with illustrative embodiments, it will be appreciated that variations and modifications will occur to those skilled in the art. Therefore, it is to be understood that the appended claims are intended to cover all such modifications and changes that fall within the true spirit of the invention.

What is claimed is:

1. A binder composition comprising:
   50.0-94.0 parts by weight of liquefied sodium silicate;
   5.0-30.0 parts by weight of nano silica; and
   0.5-10.0 parts by weight of a silane composition,
   wherein the liquefied sodium silicate, the nano silica, and the silane composition are combined.

2. The binder composition of claim 1, wherein the liquefied sodium silicate comprises 76.0-80.0 parts by weight of silicon (Si), 19.6-23.0 parts by weight of sodium (Na), 0.15-0.35 parts by weight of potassium (K), 0.20-0.30 parts by weight of aluminum (Al), and 0.05-0.15 parts by weight of iron (Fe).

3. The binder composition of claim 1, wherein the nano silica comprises nanometer scaled silicon dioxide particles.

4. The binder composition of claim 1, wherein the silane composition comprises a substance from the group consisting of monosilane, an alkoxysilane, tetraethoxysilane, methylethoxysilane, sodium methylsiliconate, methyltrimethoxysilane, potassium methylsiliconate, butyltrimethoxysilane, and vinyltrimethoxysilane.

5. The binder composition of claim 1, wherein at least one of the nano silica and the silane composition increase a hydrophobic property of the binder composition.

6. The binder composition of claim 1, wherein the combining comprises mixing together liquid containing the nano silica, the liquefied sodium silicate, and the silane composition.

7. The binder composition of claim 1, wherein the binder composition is used in the fabrication of a hardcore panel.

8. A lightweight, water resistant hardcore panel, comprising:
the binder composition of claim 1 comprising liquefied sodium silicate;
a filler; and
a strength enhancer,
wherein the binder composition, the filler and the strength enhancer have been homogenized and dehydrated.

9. The lightweight, water resistant hardcore panel of claim 8, wherein the liquefied sodium silicate comprises 76.0-80.0 parts by weight of silicon (Si), 19.6-23.0 parts by weight of sodium (Na), 0.15-0.35 parts by weight of potassium (K), 0.20-0.30 parts by weight of aluminum (Al), and 0.05-0.15 parts by weight of iron (Fe).

10. The lightweight, water resistant hardcore panel of claim 8, wherein the filler comprises a substance selected from the group consisting of perlite and vermiculite.

11. The lightweight, water resistant hardcore panel of claim 8, wherein the strength enhancer comprises a substance selected from the group consisting of mica, aluminum silicate, and calcium silicate.

12. The lightweight, water resistant hardcore panel of claim 8, wherein the lightweight, water resistant hardcore panel comprises 100 parts by weight of inorganic binder composition, 35-70 parts by weight of filler, and 15-45 parts by weight of strength enhancer.

13. A method for fabricating a hardcore panel, the method comprising:
mixing the binder composition of claim 1, comprising liquefied sodium silicate, and inorganic additives together to form a mixture;
placing the mixture into a mold; and
hardening the mixture in the presence of at least one of: heat and reduced pressure.

14. The method for fabricating a hardcore panel of claim 13,
wherein the liquefied sodium silicate comprises 76.0-80.0 parts by weight of silicon (Si), 19.6-23.0 parts by weight of sodium (Na), 0.15-0.35 parts by weight of potassium (K), 0.20-0.30 parts by weight of aluminum (Al), and 0.05-0.15 parts by weight of iron (Fe).

15. The method for fabricating a hardcore panel of claim 13, further comprising mixing a hardener into the mixture, the hardener selected from the group consisting of potassium hydroxide, potassium carbonate, sodium phosphate, sodium sulfate.

16. The method for fabricating a hardcore panel of claim 13, wherein the mixture comprises 100 parts by weight of inorganic binder composition, 35-70 parts by weight of filler, and 15-45 parts by weight of strength enhancer.

17. The method for fabricating a hardcore panel of claim 13, wherein the mold is a heated press.

18. The method of fabricating a hardcore panel of claim 13, wherein the mixture is hardened at an initial temperature of between 140° C. and 290° C.

19. The method for fabricating a hardcore panel of claim 13, wherein the mixture is hardened via dehydration for a duration of at least three minutes.

* * * * *